(12) United States Patent
Kim et al.

(10) Patent No.: US 10,711,118 B2
(45) Date of Patent: Jul. 14, 2020

(54) POLYARYLENE SULFIDE RESIN COMPOSITION AND MOLDED ARTICLE THEREOF

(71) Applicant: SK CHEMICALS CO., LTD., Seongnam-si (KR)

(72) Inventors: Hae-ri Kim, Seongnam-si (KR); Jong-Wook Shin, Suwon-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 34 days.

(21) Appl. No.: 15/889,416

(22) Filed: Feb. 6, 2018

(65) Prior Publication Data
US 2018/0265678 A1    Sep. 20, 2018

(30) Foreign Application Priority Data

Mar. 20, 2017    (KR) .................. 10-2017-0034441

(51) Int. Cl.

| | |
|---|---|
| *C08K 13/02* | (2006.01) |
| *C09K 5/14* | (2006.01) |
| *C08L 81/02* | (2006.01) |
| *C08L 23/06* | (2006.01) |
| *C08G 75/0263* | (2016.01) |
| *C08G 75/029* | (2016.01) |
| *C08G 75/0213* | (2016.01) |
| *C08K 3/04* | (2006.01) |
| *C08K 3/38* | (2006.01) |
| *C08K 3/30* | (2006.01) |
| *C08K 3/22* | (2006.01) |

(52) U.S. Cl.
CPC ............ *C08K 13/02* (2013.01); *C08G 75/029* (2013.01); *C08G 75/0213* (2013.01); *C08G 75/0263* (2013.01); *C08K 3/04* (2013.01); *C08L 23/06* (2013.01); *C08L 81/02* (2013.01); *C09K 5/14* (2013.01); *C08K 2003/2217* (2013.01); *C08K 2003/2296* (2013.01); *C08K 2003/3036* (2013.01); *C08K 2003/382* (2013.01); *C08K 2201/001* (2013.01); *C08K 2201/003* (2013.01); *C08K 2201/004* (2013.01); *C08L 2203/20* (2013.01)

(58) Field of Classification Search
None
See application file for complete search history.

(56) References Cited

U.S. PATENT DOCUMENTS

| | | | | |
|---|---|---|---|---|
| 2009/0043026 A1* | 2/2009 | Tanaka | ................. | C08K 3/34 524/277 |
| 2018/0085977 A1* | 3/2018 | Ezaki | ................. | B32B 15/08 |

FOREIGN PATENT DOCUMENTS

JP    WO 2016/194361 A1 * 12/2016

* cited by examiner

*Primary Examiner* — Ana L. Woodward
(74) *Attorney, Agent, or Firm* — Sughrue Mion, PLLC

(57) ABSTRACT

The present invention relates to a polyarylene sulfide-based resin composition, which has excellent thermal conduction efficiency in the horizontal and vertical directions and excellent mechanical properties such as tensile strength and impact strength, and to a molded article thereof.

17 Claims, No Drawings

POLYARYLENE SULFIDE RESIN COMPOSITION AND MOLDED ARTICLE THEREOF

CROSS REFERENCE TO RELATED APPLICATIONS

This application claims priority based on Korean Patent Application No. 10-2017-0034441 filed Mar. 20, 2017, the content of which is incorporated herein by reference in its entirety.

TECHNICAL FIELD

The present invention relates to a polyarylene sulfide-based resin composition, which has excellent thermal conduction efficiency in the horizontal and vertical directions and excellent mechanical properties such as tensile strength and impact strength, and to a molded article thereof.

BACKGROUND ART

A polyarylene sulfide (hereinafter, referred to as "PAS") is a representative engineering plastic. Its demand is increasing for use in electronic products and various products used in high temperatures and in a corrosive environment by virtue of its high heat resistance, high chemical resistance, and high flame retardancy.

Polyphenylene sulfide (hereinafter, referred to as "PPS") is the only commercially available product among such polyarylene sulfides. However, conventional PPS has a disadvantage in that its thermal conduction efficiency in the vertical direction is lower than that of other high-performance plastics despite its excellent mechanical and thermal properties. The thermal conductivity of the entire article molded from the conventional PPS, which has low thermal conductivity in the vertical direction, is lowered. The bigger the molded article is, the more the thermal conductivity thereof tends to decrease.

In order to improve the physical properties of PPS, a resin composition that comprises graphite as a thermally conductive filler in addition to PPS has been proposed (Korean Laid-open Patent Publication No. 2010-0075878). However, the resin composition disclosed in the above-cited patent publication has a poor thermal conductivity.

Especially, in order to improve the thermal conductivity of PPS, a composition that comprises a plate-shaped inorganic material having a high thermal conductivity in addition to PPS has been proposed in the prior art. In this composition, however, the thermal conductivity in the orientation direction of the added inorganic material is increased, whereas the thermal conductivity in the vertical direction to the orientation direction is low. In addition, a composition that comprises an insulative ceramic in a spherical shape such as alumina and magnesium oxide in addition to PPS has a similar thermal conductivity in the horizontal and vertical directions. However, the thermal conductivity of the added inorganic material itself is so low that it cannot satisfy the thermal conductivity required for the recent trend that electronic devices have become lighter, thinner, shorter, and smaller with high performance.

In the meantime, as the applicable range of a high heat dissipation material is expanded from electronic and communication devices to automobile parts, the size of molded articles is varied, and products having excellent heat conduction efficiency in the horizontal and vertical directions are required regardless of the size of the molded article.

Accordingly, there is a need to develop a resin composition, which improves thermal conductivity or insulation in the horizontal and vertical directions of the composition, has excellent thermal conductivity regardless of the size of a molded article, and minimizes deterioration of the physical properties of PPS.

DISCLOSURE OF INVENTION

Technical Problem

Accordingly, an object of the present invention is to provide a polyarylene sulfide-based resin composition, which has excellent thermal conductivity in the horizontal and vertical directions and excellent mechanical properties such as tensile strength and impact strength.

In addition, the present invention aims to provide a molded article, which comprises the polyarylene sulfide-based resin composition and has properties optimized for each application.

Solution to Problem

In order to accomplish the above object, the present invention provides a polyarylene sulfide-based resin composition, which comprises:
a polyarylene sulfide,
graphite comprising spherical graphite,
boron nitride, and
at least one inorganic filler selected from the group consisting of zinc sulfide, magnesium oxide, and zinc oxide.

The present invention also provides a molded article produced by molding the polyarylene sulfide-based resin composition.

Advantageous Effects of Invention

The polyarylene sulfide-based resin composition according to the present invention is excellent in thermal conductivity in the horizontal and vertical directions, has improved compatibility with other polymer materials and fillers, and is excellent in such mechanical properties as tensile strength and impact strength.

The resin composition can be suitably used as a high heat dissipation plastic for automobile, electric, electronic, and communication products, while the deterioration of the excellent physical properties peculiar to polyarylene sulfides is minimized. This is because the compatibility of the components constituting the resin composition is improved such that the physical properties of the components can produce a synergistic effect.

BEST MODE FOR CARRYING OUT THE INVENTION

Hereinafter, the polyarylene sulfide-based resin composition of the present invention and the molded article produced by molding the polyarylene sulfide-based resin composition will be described in detail.

Polyarylene Sulfide-Based Resin Composition

The present invention provides a polyarylene sulfide-based resin composition, which comprises a polyarylene sulfide; graphite comprising spherical graphite; boron nitride; and at least one inorganic filler selected from the group consisting of zinc sulfide, magnesium oxide, and zinc oxide.

The resin composition, which is obtained by mixing a polyarylene sulfide with spherical graphite, boron nitride, and at least one inorganic filler selected from the group consisting of zinc sulfide, magnesium oxide, and zinc oxide, has a ratio of thermal conductivity in the horizontal direction to that in the vertical direction similar to that of conventional PPS resin compositions, with an excellent heat conduction performance. The resin composition has excellent thermal conductivity, while exhibiting excellent mechanical properties peculiar to polyarylene sulfides. Therefore, it is suitable for a plastic heat dissipation material having excellent physical properties in response to the demand in the related industries.

Polyarylene Sulfide

The polyarylene sulfide has a melt viscosity of 10 to 50,000 poises, about 100 to 20,000 poises, about 300 to 10,000 poises, about 600 to 900 poises, or about 600 to 850 poises, when measured at 300° C. in a rotating disk viscometer. If the melt viscosity is within the above range, the processability of the resin composition may be improved, and the resin composition may have excellent mechanical properties.

The polyarylene sulfide may have a number average molecular weight of 5,000 to 50,000 g/mole, about 8,000 to 40,000 g/mole, or about 10,000 to 30,000 g/mole. Further, the polyarylene sulfide may have a dispersity, as defined by a ratio of weight average molecular weight to number average molecular weight, of about 2.0 to 4.5, about 2.0 to 4.0, or about 2.0 to 3.5. If the number average molecular weight and the dispersity of the polyarylene sulfide are within the above ranges, the processability and the mechanical properties of the resin composition may be improved, which enables the resin composition to be processed into various molded articles for use in various applications.

The polyarylene sulfide may have a melting point of about 265 to 290° C., about 270 to 285° C., or about 275 to 283° C. If the melting point of the polyarylene sulfide is within the above range, the heat resistance and the flame retardancy of the resin composition may be improved.

The polyarylene sulfide may be prepared by melt polymerization or solution polymerization.

For example, the melt polymerization may be a method comprising the step of polymerizing a reactant comprising a diiodide aromatic compound and a sulfur element. In addition, the melt polymerization may be a method comprising the further step of adding a compound having a reactive group while the polymerization reaction step is being carried out.

The diiodide aromatic compound may be selected from the group consisting of diiodobenzene (DIB), diiodonaphthalene, diiodobiphenyl, diiodobisphenol, and diiodobenzophenone, but is not limited thereto. Further, the diiodide aromatic compound may have a substituent such as an alkyl group or a sulfone group in the above-mentioned compounds, and a diiodide aromatic compound in which an atom such as oxygen or nitrogen is contained in the aromatic group may also be used. In addition, the diiodide aromatic compound has various isomers depending on the position where the iodine atom is attached. Among them, a compound in which iodine is attached to a para position such as para-diiodobenzene (p-DIB), 2,6-diiodonaphthalene, or p,p'-diiodobiphenyl may be more suitably used.

The sulfur element in the reactant is not particularly limited in its form. Normally, the sulfur element exists in cyclooctasulfur ($S_8$) at room temperature in which eight atoms are connected. If sulfur is commercially available in any solid or liquid state other than the above form, it can be used without limitation.

The reactant for the production of a polyarylene sulfide may further comprise a polymerization initiator, a stabilizer, or a mixture thereof, in addition to the diiodide aromatic compound and the sulfur element. For example, the polymerization initiator may be at least one selected from the group consisting of 1,3-diiodo-4-nitrobenzene, mercaptobenzothiazole, 2,2'-dithiobenzothiazole, cyclohexylbenzothiazole sulfenamide, and butylbenzothiazole sulfenamide, but is not limited thereto. The stabilizer is not particularly limited as long as it is a stabilizer usually used in the polymerization reaction of a resin.

The addition of the compound having a reactive group may be performed when the polymerization reaction of the reactant comprising the diiodide aromatic compound and the sulfur element proceeds at least about 90% or from 90 to lower than 100% (for example, at a later stage of the polymerization reaction) where the degree of polymerization is measured as a ratio of the present viscosity to the target viscosity. The degree of polymerization reaction can be determined by setting the molecular weight of the polyarylene sulfide to be obtained and the target viscosity of the resulting polymerization product according thereto; and by measuring the present viscosity in accordance with the progress of the polymerization reaction to thereby determine the ratio of the present viscosity to the target viscosity. In such event, the method of measuring the present viscosity may be one that is obvious to a person skilled in the art depending on the reactor scale. For example, in the case where the polymerization is carried out in a relatively small polymerization reactor, a sample undergoing the polymerization in the reactor can be taken and measured with a viscometer. On the other hand, in the case where the polymerization is carried out in a large, continuous polymerization reactor, the present viscosity can be automatically measured continuously and in real time by a viscometer installed in the reactor itself.

When the reactant comprising the diiodide aromatic compound and the sulfur element is subjected to the polymerization reaction along with the compound having a reactive group added thereto at a late stage of the polymerization reaction as described above, the polyarylene sulfide thus produced may be a melt-polymerized polyarylene sulfide in which the reactive group is introduced into at least a part of the end groups in the main chains. The polyarylene sulfide in which a reactive group is introduced into at least a part of the end groups in the main chains as described above has excellent compatibility with other polymeric materials and fillers that comprise a certain inorganic filler, while maintaining excellent physical properties peculiar to polyarylene sulfides.

Any compound in the form of a monomer (i.e., single molecule) having a carboxyl group, an amine group, or a hydroxyl group can be used as the compound having a reactive group. Examples of the compound having a reactive group include 2-iodobenzoic acid, 3-iodobenzoic acid, 4-iodobenzoic acid, 2,2'-dithiobenzoic acid, 2-iodoaniline, 3-iodoaniline, 4-iodoaniline, 2,2'-dithiodianiline, 4,4'-dithiodianiline, 2,2'-dithiodiphenyl, and 4,4'-dithiodiphenyl. Various compounds having a carboxyl group, an amine group, or a hydroxyl group other than the above can also be used.

The compound having a reactive group may be used in an amount of 0.0001 to 5 parts by weight, 0.001 to 3 parts by weight, 0.01 to 2 parts by weight, or 0.5 to 1.5 parts by weight, based on 100 parts by weight of the diiodide aromatic compound. If the compound having a reactive group is used within the above amount range, the polyarylene sulfide thus produced may have the reactive group introduced in a proper amount into the end groups in the main chains and have excellent compatibility with other polymeric materials and fillers such as inorganic fillers, while maintaining excellent physical properties peculiar to polyarylene sulfides.

In the meantime, a polymerization terminator may be further added to the reactant during the polymerization or when the polymerization is carried out to a certain extent. The polymerization terminator is not particularly limited as long as it is a compound capable of stopping the polymerization by removing the iodine group contained in the polymer to be polymerized. Specifically, the polymerization terminator may be at least one selected from the group consisting of diphenyl sulfide, diphenyl ether, diphenyl, benzophenone, dibenzothiazole disulfide, monoiodide aryl compounds, benzothiazoles, benzothiazolesulfenamides, thiurams, dithiocarbamates, and diphenyl disulfide. More specifically, the polymerization terminator may be at least one selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N,N-dicyclohexylbenzothiazole-2-sulfenamide, tetramethylthiuram monosulfide, tetramethylthiuram disulfide, zinc dimethyldithiocarbamate, zinc diethyldithiocarbamate, and diphenyl disulfide.

The timing of adding the polymerization terminator can be determined in consideration of the molecular weight of the polyarylene sulfide to be finally polymerized. For example, the polymerization terminator may be added when about 70 to 100% by weight of the diiodide aromatic compound contained in the initial reactant has exhausted by the reaction.

The polymerization reaction as described above is not particularly limited as long as the condition is capable of initiating the polymerization of the reactant comprising the diiodide aromatic compound and the sulfur element. For example, the polymerization reaction can be carried out under the conditions of an elevated temperature and a reduced pressure, in which case the polymerization reaction may be carried out for about 1 to 30 hours while the temperature rises and the pressure drops from the initial reaction conditions of about 180 to 250° C. and about 50 to 450 Torrs to the final reaction conditions of about 270° C. to 350° C. and about 0.001 to 20 Torrs. Specifically, the polymerization reaction may be carried out under the final reaction conditions of about 280 to 300° C. and about 0.1 to 1 Torr.

According to an embodiment of the present invention, a step of melt-mixing the reactant comprising the diiodide aromatic compound and the sulfur element may be further carried out before the polymerization reaction. The melt-mixing is not particularly limited as long as all of the above-mentioned reactants can be melt-mixed, but it may be carried out at a temperature of, for example, about 130 to 200° C. or about 160 to 190° C. If the melt-mixing step is carried out before the polymerization reaction as described above, the polymerization reaction to be subsequently carried out can proceed more readily.

According to an embodiment of the present invention, the polymerization reaction can be carried out in the presence of a nitrobenzene-based catalyst. In addition, if the melt-mixing step is carried out before the polymerization reaction as described above, the nitrobenzene-based catalyst may be added in the melt-mixing step. The nitrobenzene-based catalyst may be 1,3-diiodo-4-nitrobenzene or 1-iodo-4-nitrobenzene, but is not limited thereto.

In the meantime, the polyarylene sulfide may be prepared through solution polymerization, and the solution polymerization may comprise the steps of solution mixing, dehydration, polymerization, separation, washing, drying, and heat treatment.

For example, an organic polar solvent and an alkali metal sulfide are charged to a high-pressure reactor, and mixed under a nitrogen flow, and then water is removed through a dehydration process.

For example, the organic polar solvent may be at least one selected from the group consisting of N,N-dimethylformamide, N,N-dimethylacetamide, N,N-diethylacetamide, N,N-dipropylacetamide, caprolactam, N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-methyl-3-methyl-2-pyrrolidone, N-cyclohexyl-2-pyrrolidone, and N-methyl-3,4,5-trimethyl-2-pyrrolidone. Specifically, the organic polar solvent may be an N-alkyllactam or an N-alkylpyrrolidone, and more specifically N-methyl-2-pyrrolidone.

The alkali metal sulfide may be sodium sulfide, lithium sulfide, potassium sulfide, or rubidium sulfide. Specifically, the alkali metal sulfide may be sodium sulfide.

The dehydration process can be performed using an alkali metal hydroxide. Examples of the alkali metal hydroxide include sodium hydroxide, potassium hydroxide, aluminum hydroxide, and the like. Specifically, the alkali metal hydroxide may be sodium hydroxide.

After the dehydration process, at least one halogen compound selected from the group consisting of a dihalogen benzene compound and a trihalogen aromatic compound is added to the solution, which is then polymerized. In order to separate the polyarylene sulfide produced as a result of the polymerization reaction from the reaction mixture, the reaction solution may directly be centrifuged, or hot water may be added to the reaction solution, followed by stirring and filtering the reaction solution.

Examples of the dihalogen benzene compound include p-dichlorobenzene, p-dibromobenzene, p-diiodobenzene, 1-chloro-4-bromobenzene, 1-chloro-4-iodobenzene, 1-ethyl-2,5-dichlorobenzene, 1-ethyl-2,5-dibromobenzene, and the like. Specifically, the dihalogen benzene compound may be p-dichlorobenzene.

Examples of the trihalogen aromatic compound include 1,2,4-trichlorobenzene, 1,2,4-tribromobenzene, 1,2,4-triiodobenzene, and the like. Specifically, the trihalogen aromatic compound may be 1,2,4-trichlorobenzene.

The polyarylene sulfide thus separated may be washed with water or acetone.

The washed polyarylene sulfide may be dried, followed by heat treatment. The heat treatment may be performed at 200 to 350° C. for 2 to 60 hours.

In the resin composition, graphite, boron nitride, and an inorganic filler may be structurally connected to each other in surface contact with each other in the polyarylene sulfide. Specifically, the graphite, the boron nitride, and the inorganic filler may be dispersed in a form that is structurally connected to each other in surface contact with each other in the polymer matrix of the polyarylene sulfide. Due to the interaction between the graphite, the boron nitride, and the inorganic filler, the resin composition has excellent thermal conductivity in the horizontal and vertical directions, while maintaining excellent mechanical properties peculiar to PPS.

Boron Nitride

The boron nitride may be one whose surface has been subjected to an organic coating treatment. For example, the boron nitride may be one whose surface is coated with an organic material such as stearic acid, organic titanate, organic zirconate, or polydimethylsiloxane. The boron nitride having an organic coating on its surface may improve the contact area, affinity, and compatibility with a polyarylene sulfide.

The boron nitride may have a hexagonal crystal structure with an average particle diameter of 5 to 1,000 µm and an aspect ratio of 50 to 300. Specifically, the boron nitride may have an average particle diameter of 5 to 100 µm or 5 to 50 µm and an aspect ratio of 50 to 300.

The boron nitride may comprise two or more kinds of boron nitride having different average particle diameters. Specifically, the boron nitride may comprise two or more kinds of boron nitride having an average particle diameter difference of 5 to 30 µm or 10 to 20 µm. The mixing of two or more kinds of boron nitride having different average particle diameters as described above further optimizes the packing density of the filler and can further improves the thermal conductivity of the resin composition.

Graphite

The graphite comprises spherical graphite. In addition, the graphite may have an average particle diameter of 1 to 1,000 µm.

The spherical graphite may be obtained by milling natural graphite in the form of a plate to a spherical shape and refining it by acid treatment. Specifically, the spherical graphite may have an average particle diameter of 1 to 1,000 µm. More specifically, the spherical graphite may have an average particle diameter of 10 to 100 µm. If the average particle diameter of the spherical graphite is within the above range, its surface area is greatly increased, which prevents a deterioration of injection molding processability due to an increase in viscosity of the resin and improves the thermal conductivity of the composition without a deterioration of such mechanical properties as impact resistance and tensile strength.

If the resin composition comprises spherical graphite, the orientation of the graphite is low since it is spherical. Thus, the free electron can move in every direction, which enables the resin composition to have excellent heat dissipation effect in all directions of the resin composition. In particular, since natural graphite has high thermal conductivity, it exhibits improved heat conduction performance over conventional resin compositions that comprise spherical inorganic materials such as aluminum oxide, magnesium oxide, and zinc sulfide. In addition, the use of spherical inorganic material reduces deformation after injection and exhibits excellent electric conductivity. Therefore, the resin composition is suitable as an injection material for parts of a mobile communication repeater.

The graphite may further comprise expandable graphite. Specifically, the graphite may comprise spherical graphite and expandable graphite.

The expandable graphite may be one obtained by a physical and chemical layer separation of natural graphite.

Inorganic Filler

The inorganic filler is at least one selected from the group consisting of zinc sulfide, magnesium oxide, and zinc oxide.

The zinc sulfide may have a specific surface area of 50 to 300 $m^2/g$. In addition, the zinc sulfide may have a crystal structure of a zinc blende structure. Furthermore, the zinc sulfide may have an average particle diameter of 0.1 to 10 µm, 0.1 to 5 µm, 0.1 to 1 µm, or 0.4 to 0.8 µm.

The magnesium oxide may have a purity of about 97% or more and an average particle diameter of about 3 to 5 µm. In addition, the magnesium oxide may have a specific surface area of about 30 to 200 $m^2/g$ or about 30 to 100 $m^2/g$. Furthermore, the magnesium oxide may be in a form that its surface is coated to suppress the oxidation reaction in the air.

The zinc oxide may have a purity of about 99% or more and an average particle diameter of about 0.1 to 1 µm or about 0.3 to 0.8 µm. In addition, the zinc oxide may have a specific surface area of about 3 to 7 $m^2/g$ or about 3.5 to 6 $m^2/g$.

The resin composition may comprise 10 to 80% by weight of the polyarylene sulfide, 1 to 50% by weight of the graphite, 1 to 50% by weight of the boron nitride, and 1 to 50% by weight of the inorganic filler. Specifically, the resin composition may comprise 30 to 60% by weight, 35 to 55% by weight, or 40 to 50% by weight of the polyarylene sulfide, 1 to 30% by weight, 1 to 25% by weight, or 5 to 20% by weight of the graphite, 1 to 40% by weight, 5 to 40% by weight, or 5 to 35% by weight of the boron nitride, and 1 to 40% by weight, 1 to 30% by weight, or 5 to 30% by weight of the inorganic filler.

If each component is contained in the above amount range, excellent thermal conductivity and mechanical properties can be achieved due to the mixing of the filler, while excellent physical properties peculiar to polyarylene sulfides are maintained.

Additives

The resin composition may further comprise at least one additive selected from the group consisting of a metal oxide, a thermoplastic resin, a thermoplastic elastomer, a filler, an antioxidant, and a compatibilizer. Specifically, the additive may be contained in an amount of 0.1 to 50% by weight, 1 to 30% by weight, 1 to 20% by weight, or 5 to 15% by weight, based on the total weight of the resin composition.

The metal oxide may be at least one selected from the group consisting of $FeCr_2O_4$, $MgCr_2O_4$, $CuCr_2O_4$, $MnCr_2O_4$, $FeAl_2O_4$, $MgAl_2O_4$, $ZnAl_2O_4$, $CuFe_2O_4$, $MnFe_2O_4$, $NiFe_2O_4$, and $TiFe_2O_4$. In addition, the resin composition may comprise 0.1 to 30% by weight of the metal oxide based on the total weight of the resin composition.

The thermoplastic resin may be, for example, a polyvinyl alcohol-based resin, a vinyl chloride-based resin, a polyamide-based resin, a polyolefin-based resin, or a polyester-based resin.

The thermoplastic elastomer may be, for example, a polyvinyl chloride-based elastomer, a polyolefin-based elastomer, a polyurethane-based elastomer, a polyester-based elastomer, a polyamide-based elastomer, or a polybutadiene-based elastomer.

The filler may be an organic or inorganic filler in the form of fibers, beads, flakes, or powders. For example, the filler may be glass fibers, carbon fibers, boron fibers, glass beads, glass flakes, talc, or calcium carbonate. Specifically, the filler may be glass fibers.

The glass fiber can reinforce the mechanical properties of the resin composition and the molded article. In addition, the glass fiber may have a surface treated with a silane coupling agent or the like, or it may be in an untreated form. If a glass fiber whose surface is treated with a silane coupling agent is used, the cohesion or compatibility with the polyarylene sulfide can be further improved. Further, the glass fiber may have a length of 2 to 6 mm, 3 to 6 mm, or 3 to 5 mm and an average particle diameter of 5 to 15 µm, 5 to 13 µm, or 9 to 13 µm. Furthermore, the resin composition may comprise 1 to 50% by weight of the glass fiber based on the total weight of the resin composition.

The compatibilizer improves the compatibility of the polyarylene sulfide with other fillers and the interfacial adhesion, thereby further improving the thermal conductivity and the mechanical properties of the resin composition. For example, the compatibilizer may comprise at least one selected from the group consisting of silane compounds, maleic anhydride, titanate, zirconate, fumaric acid, phosphate, stearic acid, metal stearates, and waxes. The compatibilizer may be in an amount of 0.1 to 20% by weight, 0.1 to 10% by weight, 0.1 to 5% by weight, or 0.1 to 1% by weight, based on the total weight of the resin composition.

The graphite, the boron nitride, the inorganic filler, and the additives may be dispersed in the matrix comprising the polyarylene sulfide and have a structure in which they are structurally and organically connected to each other in surface contact with each other. With the structurally and organically connected structure as described above, the thermal conductivity of the resin composition can be further improved.

The resin composition may further comprise additional additives and/or stabilizers and the like in order to improve its mechanical properties (e.g., heat resistance, weather resistance, moldability, etc.). The additional additives and the stabilizers are not particularly limited and may be, for example, an oxidation stabilizer, a light stabilizer (e.g., a UV stabilizer and the like), a plasticizer, a lubricant, a nucleating agent, and an impact reinforcement.

The oxidation stabilizer may be a primary or secondary antioxidant. For example, the oxidation stabilizer may be a hindered phenol-based, amine-based, sulfur-based, or phosphorus-based antioxidant.

The light stabilizer may be comprised in the resin composition of the present invention in the case where the resin composition is applied as an exterior material. For example, the light stabilizer may be a UV stabilizer, and benzotriazole or benzophenol may specifically be used.

The lubricant may be added to improve the moldability of the resin composition and may be, for example, hydrocarbon-based lubricants. If the resin composition comprises a lubricant, it may impart such releasability as prevention of friction between the resin composition and the metal mold and detachment from the mold.

The nucleating agent may serve to improve the crystallization rate of the resin composition. If the resin composition comprises a nucleating agent, it has such advantages as improvement of the solidification speed of the product at the time of extrusion and/or injection and shortening of the cycle time of the product.

The additives and the additional additives may comprise other various polymer materials, reinforcements/fillers, additives, and so on in addition to the above-mentioned polymer materials, fillers, and additives. Specifically, the resin composition may comprise various polymer materials or fillers without limitation for the purpose of improving its mechanical properties, heat resistance, weather resistance, or moldability.

The resin composition has a tensile strength as measured according to ASTM D 638 of about 100 to 2,000 kgf/cm², about 200 to 1,500 kgf/cm², about 500 to 1,500 kgf/cm², about 600 to 1,100 kgf/cm², or about 700 to 1,100 kgf/cm².

The resin composition may have an impact strength as measured according to ASTM D 256 of about 1 to 100 J/m, about 5 to 60 J/m, about 30 to 60 J/m, or about 40 to 60 J/m.

Molded Article

The present invention provides a molded article produced by molding the polyarylene sulfide-based resin composition as described above.

The molding may comprise the step of extruding the polyarylene sulfide-based resin composition. Specifically, the molding may comprise the steps of mixing the polyarylene sulfide-based resin composition and extruding the same. More specifically, the molding can be performed using a twin screw extruder. The twin screw extruder may have a length to diameter (L/D) ratio of about 30 to 50.

For example, such additive as an antioxidant, a compatibilizer, and a thermoplastic resin to be added in small amounts are first mixed with a polyarylene sulfide in a mixer such as a super mixer to thereby prepare a first composition. The first composition may be then fed to the main inlet of the twin screw extruder. In addition, such fillers as boron nitride, zinc sulfide, magnesium oxide, zinc oxide, and graphite, other than the additives to be added in small amounts, may be separately fed through a side feeder located on the side of the twin screw extruder. In such event, the side feeder may be located at approximately ⅓ to ½ from the outlet in the entire barrel of the extruder. If the side feeder is located within the above range, the fillers or the like can be prevented from being broken in the extruder by rotation and friction caused by the extruder screw.

The molded article may be in the form of a film, a sheet, or a fiber. Further, the molded article may be an injection molded article, an extrusion molded article, or a blow molded article. In the case where the molded article is an injection molded article, the mold temperature may be about 50° C. or more, about 60° C. or more, or about 80° C. or more, from the viewpoint of crystallization, and about 190° C. or less, about 170° C. or less, or about 160° C. or less, from the viewpoint of deformation of the specimen.

In the case where the molded article is in the form of a film or a sheet, it may be various films or sheets, for instance, unstretched, uniaxially stretched, and biaxially stretched. In addition, in the case where the molded article is in the form of a fiber, it may be in the form of various fibers such as an undrawn yarn, a drawn yarn, or a highly drawn yarn. Furthermore, the molded article can be used as a fabric, a knitted fabric, a nonwoven fabric (e.g., spunbond, meltblown, and staple), a rope, or a net.

The molded article may be used for coating electric parts, electronic parts, building members, automobile parts, mechanical parts, daily necessities, or parts in contact with chemicals, or for industrial materials. Specifically, the molded article may be used for automobile parts, electric parts, electronic parts, or industrial materials. Particularly, since the molded article has excellent thermal conductivity and mechanical properties, it can be suitably applied as a high heat dissipation plastic for electric parts, electronic parts, and the like. For example, the electrical part may be a part for a mobile communication repeater.

MODE FOR THE INVENTION

Hereinafter, the present invention will be described in more detail with reference to the following examples. However, these examples are set forth to illustrate the present invention, and the scope of the present invention is not limited thereto.

Preparation Example 1: Synthesis of a Polyarylene Sulfide Having a Carboxyl Group at the Ends of the Main Chains 5,130 g of p-diiodobenzene (p-DIB) and 450 g of sulfur were charged to a 5-liter reactor equipped with a thermocouple capable of measuring the temperature inside the reactor and a vacuum line capable of nitrogen purging and vacuum application. The reactor was then heated to 180° C. to completely melt and mix the reactants. Thereafter, the temperature rose and the pressure dropped gradually for 4 hours starting from the initial reaction conditions of 220° C. and 350 Torrs to the final reaction temperature of 300° C. and the final reaction pressure of 0.6 to 0.9 Torr, and the polymerization reaction was carried out while sulfur was added in seven times in an amount of 19 g in each addition.

The progress of the polymerization reaction was measured as a relative ratio of the present viscosity to the target viscosity by the equation "(current viscosity/target viscosity)×100." The target viscosity was set for 600 poises, and the present viscosity was measured with a viscometer for a sample collected during the polymerization reaction. When the polymerization reaction proceeded to 80% of completion, 35 g of diphenyl disulfide was added as a polymerization terminator, and the reaction was carried out for 1 hour.

Then, when the polymerization reaction proceeded to 90% of completion, 51 g of 4-iodobenzoic acid was added as a compound having a reactive group, and the reaction was carried out in a nitrogen atmosphere for 10 minutes. Thereafter, the reaction was conducted for 2 hours by slowly applying a vacuum to 0.5 Torr or less and then terminated to thereby synthesize a polyarylene sulfide resin (hereinafter, referred to as "PPS-1 resin") having a carboxyl group at the ends of the main chains. The PPS-1 resin thus prepared was processed in the form of pellets using a small strand cutter.

The PPS-1 resin was analyzed by FT-IR. As a result, the presence of a carboxy group peak around 2,400 to 3,600 cm$^{-1}$ on the FT-IR spectrum was confirmed. Further, the height intensity of the peak appearing around 2,400 to 3,600 cm$^{-1}$ was about 3.4% relative to the height intensity of the ring stretch peak appearing around 1,400 to 1,600 cm$^{-1}$ on the FT-IR spectrum, which is taken as 100%.

The PPS-1 resin was further analyzed for measuring its melting point (Tm), number average molecular weight (Mn), molecular weight distribution (PDI), and melt viscosity (MV) in the following manner. As a result, the PPS-1 resin had a melting point of 280° C., an Mn of 16,420 g/mole, a PDI of 2.9, and a melt viscosity of 632 poises.

Melt Viscosity

Melt viscosity was measured with a rotating disk viscometer at Tm+20° C. In the measurement by a frequency sweep method, an angular frequency was measured from 0.6 to 500 rad/s, and the viscosity at 1.0 rad/s was defined as the melt viscosity.

Melting Point

The temperature was elevated from 30° C. to 320° C. at a rate of 10° C./min in a differential scanning calorimeter (DSC), and the temperature was cooled to 30° C., followed by a temperature elevation again from 30° C. to 320° C. at a rate of 10° C./min to measure the melting point.

Number Average Molecular Weight (Mn) and Molecular Weight Distribution (PDI)

The PPS resin was dissolved in 1-chloronaphthalene at a concentration of 0.4% by weight with stirring at 250° C. for 25 minutes to prepare a sample. Then, the sample was flowed at a flow rate of 1 ml/min in a high-temperature gel permeation chromatography (GPC) system (at 210° C.) and sequentially separated in the column to polyphenylene sulfides having different molecular weights. The intensity of the separated polyphenylene sulfides having different molecular weights was measured with an RI detector. A calibration curve was prepared with a standard sample (i.e., polystyrene) having a known molecular weight, and the relative number average molecular weight (Mn) and the molecular weight distribution (PDI) of the sample were calculated.

Preparation Example 2: Synthesis of a Polyarylene Sulfide Having an Amine Group at the Ends of the Main Chains A polyphenylene sulfide resin (hereinafter, referred to as "PPS-2 resin") having an amine group at the ends of the main chains was prepared in the same manner as in Preparation Example 1, except that 4-iodoaniline instead of 4-iodobenzoic acid was used as the compound having a reactive group.

The PPS-2 resin was analyzed by FT-IR. As a result, the presence of an amine group peak around 3,180 to 3,350 cm$^{-1}$ on the FT-IR spectrum was confirmed. Further, the height intensity of the peak appearing around 3,180 to 3,350 cm$^{-1}$ was about 1.4% relative to the height intensity of the ring stretch peak appearing around 1,400 to 1,600 cm$^{-1}$ on the FT-IR spectrum, which is taken as 100%.

The PPS-2 resin was further analyzed for measuring its melting point (Tm), number average molecular weight (Mn), molecular weight distribution (PDI), and melt viscosity (MV) in the same manner as in Preparation Example 1. As a result, the PPS-2 resin had a melting point of 282° C., an Mn of 16,480 g/mole, a PDI of 2.8, and a melt viscosity of 745 poises.

Preparation Example 3: Synthesis of a Polyarylene Sulfide Having a Hydroxyl Group at the Ends of the Main Chains A polyphenylene sulfide resin (hereinafter, referred to as "PPS-3 resin") having a hydroxyl group at the ends of the main chains was prepared in the same manner as in Preparation Example 1, except that 4,4'-dithiodiphenol instead of 4-iodobenzoic acid was used as the compound having a reactive group.

The PPS-3 resin was analyzed by FT-IR. As a result, the presence of hydroxyl group peaks around 3,300 to 3,400 cm$^{-1}$ and around 3,600 to 3,650 cm$^{-1}$ on the FT-IR spectrum was confirmed. Further, the height intensity of the peak appearing around 3,300 to 3,400 cm$^{-1}$ and around 3,600 to 3,650 cm$^{-1}$ was about 0.58% relative to the height intensity of the ring stretch peak appearing around 1,400 to 1,600 cm$^{-1}$ on the FT-IR spectrum, which is taken as 100%.

The PPS-3 resin was further analyzed for measuring its melting point (Tm), number average molecular weight (Mn), molecular weight distribution (PDI), and melt viscosity (MV) in the same manner as in Preparation Example 1. As a result, the PPS-3 resin had a melting point of 280° C., an Mn of 15,890 g/mole, a PDI of 2.9, and a melt viscosity of 688 poises.

Preparation Example 4: Synthesis of a PPS-4 Resin

A polyphenylene sulfide resin (hereinafter, referred to as "PPS-4 resin") having no substituent group at the ends of the main chains was prepared in the same manner as in Preparation Example 1, except that no 4-iodobenzoic acid was used.

The PPS-4 resin was analyzed for measuring its melting point (Tm), number average molecular weight (Mn), molecular weight distribution (PDI), and melt viscosity (MV) in the same manner as in Preparation Example 1. As a result, the PPS-4 resin had a melting point of 282° C., an Mn of 16,050 g/mole, a PDI of 2.8, and a melt viscosity of 655 poises.

Preparation Example 5: Synthesis of a PPS-5 Resin (Solution Polymerization)

255.9 g of sodium sulfide and 500 ml of N-methyl-2-pyrrolidone (hereinafter, referred to as NMP) were charged to a 1.7-liter pressurized reactor equipped with a stirrer and a dehydration bath, which was then purged with nitrogen. The materials contained in the pressurized reactor were heated to 160° C. under a nitrogen stream, held for 1 hour, and then heated to 205° C. to remove water. Thereafter, the temperature inside the pressurized reactor was cooled to 170° C., and a solution of p-dichlorobenzene dissolved in 300 ml of NMP was added to the dehydrated materials. The pressurized reactor was sealed and heated to 250° C. to carry out the reaction for 3 hours. Here, the reaction pressure was maintained at 5.0 kgf/cm$^2$.

Upon completion of the reaction, the reactor was cooled to room temperature, and then the lid of the reactor was opened. The reaction product in the form of slurry was taken out, washed with 2 liters of water twice, and dried at 120° C. under a vacuum. The polyarylene sulfide thus prepared was subjected to heat treatment at 250° C. for 6 hours in a heating furnace to thereby obtain a polyarylene sulfide (hereinafter, referred to as "PPS-5 resin") powder.

The PPS-5 resin was analyzed for measuring its melting point (Tm), number average molecular weight (Mn), molecular weight distribution (PDI), and melt viscosity (MV) in the same manner as in Preparation Example 1. As a result, the PPS-5 resin had a melting point of 281° C., an Mn of 22,050 g/mole, a PDI of 2.8, and a melt viscosity of 820 poises.

Example 1: Preparation of a Polyarylene Sulfide-Based Resin Composition

An antioxidant, a PPS resin, a compatibilizer, and high-density polyethylene (HDPE) were uniformly mixed in a super mixer according to the composition shown in Table 1 below to obtain a primary composition. The primary composition was automatically weighed and fed to the hopper of a twin screw extruder (40 mm extruder, L/D: 40).

In the meantime, a filler containing boron nitride (BN), graphite, and zinc sulfide was weighed according to the composition, uniformly mixed in a super mixer, and fed to the primary side feeder located on the side of the twin screw extruder. In order to keep the amount of the filler constant, the filler was supplied to the primary side feeder by a separate metering and feeding device and was introduced into the twin screw extruder through the primary side feeder. The filler thus introduced was uniformly mixed with the primary composition by the mixing screw in the twin screw extruder.

After a glass fiber was fed through the secondary side feeder and mixed, a volatile gas was removed under a reduced pressure, and a pellet-type PPS resin composition was prepared using a chip cutter.

Examples 2 to 12 and Comparative Examples 1 to 5

PPS resin compositions were prepared in the same manner as in Example 1, except that the components and their amounts were as shown in Tables 1 to 3 below. The amounts of the components in the following Tables 1 to 3 are expressed as % by weight.

TABLE 1

| Component (% by weight) | Ex. 1 | Ex. 2 | Ex. 3 | Ex. 4 | Ex. 5 | Ex. 6 | Ex. 7 |
|---|---|---|---|---|---|---|---|
| PPS-1 | 41.8 | 43.8 | 49.8 | — | — | — | — |
| PPS-2 | — | — | — | 49.8 | — | — | — |
| PPS-3 | — | — | — | — | 49.8 | — | — |
| PPS-4 | — | — | — | — | — | 49.8 | — |
| PPS-5 | — | — | — | — | — | — | 49.8 |
| BN-1 | 10 | 7 | 5 | 5 | 5 | 5 | 5 |
| BN-2 | 22 | 7 | — | — | — | — | — |
| ZnS | 5 | 15 | 5 | 5 | 5 | 5 | 5 |
| MgO | — | — | — | — | — | — | — |
| ZnO | — | — | — | — | — | — | — |
| Graphite 1 | 11 | 17 | 30 | 30 | 30 | 30 | 30 |
| Graphite 2 | — | — | — | — | — | — | — |
| Graphite 3 | — | — | — | — | — | — | — |
| Glass fiber | 10 | 10 | 10 | 10 | 10 | 10 | 10 |
| Compatibilizer | 0.2 | 0.2 | 0.2 | 0.2 | 0.2 | 0.2 | 0.2 |
| Metal oxide | — | — | — | — | — | — | — |

TABLE 2

| Component (% by weight) | Ex. 8 | Ex. 9 | Ex. 10 | Ex. 11 | Ex. 12 |
|---|---|---|---|---|---|
| PPS-1 | 43.8 | 33.8 | 32.8 | 32.8 | 48.8 |
| PPS-2 | — | — | — | — | — |
| PPS-3 | — | — | — | — | — |
| PPS-4 | — | — | — | — | — |
| PPS-5 | — | — | — | — | — |
| BN-1 | 7 | 7 | 10 | 10 | 5 |
| BN-2 | 7 | 7 | 17 | 17 | — |
| ZnS | — | 5 | 10 | 10 | 5 |
| MgO | 15 | — | — | — | — |
| ZnO | — | 20 | — | — | — |
| Graphite 1 | 17 | 17 | 5 | 5 | 30 |
| Graphite 2 | — | — | 15 | 10 | — |
| Graphite 3 | — | — | — | 5 | — |
| Glass fiber | 10 | 10 | 10 | 10 | 10 |
| Compatibilizer | 0.2 | 0.2 | 0.2 | 0.2 | 0.2 |
| Metal oxide | — | — | — | — | 1 |

TABLE 3

| Component | Comp. Ex. 1 | Comp. Ex. 2 | Comp. Ex. 3 | Comp. Ex. 4 | Comp. Ex. 5 |
|---|---|---|---|---|---|
| PPS-1 | 43.8 | 34.8 | 34.8 | 43.8 | 49.8 |
| PPS-2 | — | — | — | — | — |
| BN-1 | 7 | 5 | — | 7 | 5 |
| BN-2 | 7 | 10 | — | — | — |
| BN-3 | — | — | — | 7 | — |
| ZnS | 15 | 40 | — | 15 | 5 |
| ZnO | — | — | 35 | — | — |

TABLE 3-continued

| Component | Comp. Ex. 1 | Comp. Ex. 2 | Comp. Ex. 3 | Comp. Ex. 4 | Comp. Ex. 5 |
|---|---|---|---|---|---|
| Graphite 1 | — | — | 20 | 17 | — |
| Graphite 2 | — | — | — | — | — |
| Graphite 3 | 17 | — | — | — | 30 |
| Glass fiber | 10 | 10 | 10 | 10 | 10 |
| Compatibilizer | 0.2 | 0.2 | 0.2 | 0.2 | 0.2 |

The components used in Examples 1 to 12 and Comparative Examples 1 to 5 are shown in Table 4 below.

TABLE 4

| Component | | Features |
|---|---|---|
| PPS | PPS-1 (Prep. Ex. 1) | Melt viscosity: 632 poises; prepared by melt polymerization; end groups substituted with a carboxyl group; number average molecular weight: 16,420 g/mole; melting point: 280° C.; PDI: 2.9 |
| | PPS-2 (Prep. Ex. 2) | Melt viscosity: 745 poises; prepared by melt polymerization; end groups substituted with an amine group; number average molecular weight: 16,480 g/mole; melting point: 282° C.; PDI: 2.8 |
| | PPS-3 (Prep. Ex. 3) | Melt viscosity: 688 poises; prepared by melt polymerization; end groups substituted with a hydroxyl group; number average molecular weight: 15,890 g/mole; melting point: 280° C.; PDI: 2.9 |
| | PPS-4 (Prep. Ex. 4) | Melt viscosity: 655 poises; prepared by melt polymerization; end groups not substituted; number average molecular weight: 16,050 g/mole; melting point: 282° C.; PDI: 2.8 |
| | PPS-5 (Prep. Ex. 5) | Melt viscosity: 820 poises; prepared by solution polymerization; number average molecular weight: 22,050 g/mole; melting point: 281° C.; PDI: 2.8 |
| BN | BN-1 | Average particle diameter: 5 μm; surface coated with stearic acid |
| | BN-2 | Average particle diameter: 20 μm; surface coated with stearic acid |
| | BN-3 | Average particle diameter: 5 μm; surface not coated |
| | ZnS | Average particle diameter: 0.5 to 0.7 μm; ZnS content (96% or more); Mohs hardness: 3 |
| | MgO | Average particle diameter: 3.5 μm; specific gravity: 3.3; purity: 99.6% or more |
| | ZnO | Average particle diameter: 0.3 to 0.8 μm; specific gravity: 5.4; purity: 99.5% |
| Graphite | Graphite-1 | Spherical graphite; purity (ash): 0.3% |
| | Graphite-2 | Expandable graphite; purity (ash): 0.3% |
| | Graphite-3 | Natural graphite; purity (ash): 0.3% |
| Metal oxide | | Copper chromium oxide ($CuCr_2O_4$) (Manufacturer: Shepherd Color Co., brand name: shepherd black 1GM) |
| Glass fiber | | Average particle diameter: 10 μm; length: 4 mm (Manufacturer: Owens Corning, brand name: OCV-910) |
| Compatibilizer | | Epoxy silane; weight average molecular weight: 236 g/mole (Manufacturer: Momentive, brand name: A-187) |

Test Example 1

The resin compositions prepared in the Examples and the Comparative Examples were analyzed for measuring their physical properties according to the methods as described below, and the measurement results are shown in Tables 5 to 7 below.

The resin compositions prepared in Examples 1 to 12 and Comparative Examples 1 to 5 each were prepared into samples for measuring their physical properties and into plate samples having a thickness of 1.2 mm. The results given below were those measured at room temperature (23° C.).

(1) Thermal Conductivity

The thermal conductivity was calculated by measuring the heat capacity and the thermal diffusivity according to ASTM D1461 method. Specifically, the thermal capacity and the thermal diffusivity of the resin composition samples obtained in the Examples and the Comparative Examples were measured using a NETZSCH (LFA 427) laser flash device, and the density was measured using a gradient density column. The thermal conductivity was calculated by multiplying the thermal capacity, the thermal diffusivity, and the density.

(2) Volume Resistivity (Electrical Conductivity)

The electrical conductivity was evaluated by measuring the volume resistance according to ASTM D257. If a material has an electric conductivity of $10^{12}$ Ω·cm or more, it is referred to as an insulating type (i.e., electricity does not flow). If a material has an electric conductivity of $10^{6}$ Ω·cm or less, it is referred to as a conducting type (i.e., electricity flows).

The volume resistivity (Ω·cm) is the inherent resistance of a given pure material, which is a value that takes into account the resistance and the area of a surface to be measured and the thickness of the object. Electrodes were placed on the top and bottom of a plate sample having a certain thickness, and the resistance was measured and calculated by the following equation.

$$\text{Volume resistivity}(\rho v)(\Omega \cdot cm) = A \times Rm/t$$

In this equation, A is the contact cross-sectional area ($cm^2$) of the electrode, t is the thickness (cm) of the object to be measured, and Rm is the measured resistance (Ω).

(3) Tensile Strength

The tensile strength of the resin composition samples obtained in the Examples and the Comparative Examples was measured according to the ASTM D 638 method.

(4) Impact Strength (Izod)

The impact strength of the resin composition samples obtained in the Examples and the Comparative Examples was measured according to the ASTM D 256 method.

(5) Specific Gravity

The specific gravity of the resin composition samples obtained in the Examples and the Comparative Examples was measured according to the ASTM D 792 method.

(6) Heat Dissipation Time

The resin composition samples obtained in the Examples and the Comparative Examples were prepared into circular specimens of 2.54 mm in diameter and 1 mm in thickness and plate specimens of 150 mm in length, 150 mm in width, and 3 mm in thickness. A hot press was set at 100° C., and heat was applied until the surface temperature of the plate specimen reached 80° C. The time for which the temperature of the surface of the plate specimen decreased to 50° C. at room temperature was measured.

TABLE 5

|  | Unit | Ex. 1 | Ex. 2 | Ex. 3 | Ex. 4 | Ex. 5 | Ex. 6 |
| --- | --- | --- | --- | --- | --- | --- | --- |
| Thermal conductivity (horizontal) | W/mK | 6.7 | 6.2 | 8.9 | 8.7 | 8.8 | 8.9 |
| Thermal conductivity (vertical) | W/mK | 0.87 | 0.9 | 0.98 | 0.97 | 0.98 | 0.97 |
| Electrical conductivity | Ω·cm | 1.5E+13 | 1.2E+13 | 1.2E+4 | 1.3E+4 | 1.2E+4 | 1.3E+4 |
| Tensile strength | kgf/cm$^2$ | 800 | 950 | 1045 | 1055 | 1048 | 1040 |
| Impact strength | J/m | 54 | 52 | 52 | 53 | 52 | 54 |
| Specific gravity | — | 1.76 | 1.79 | 1.70 | 1.70 | 1.70 | 1.70 |
| Heat dissipation time (circular specimen) | s | 15 | 13 | 9 | 9 | 9 | 9 |
| Heat dissipation time (plate specimen) | s | 110 | 101 | 80 | 82 | 81 | 82 |
| Type |  | Insulating | Insulating | Conducting | Conducting | Conducting | Conducting |
| Color |  | BLACK | BLACK | BLACK | BLACK | BLACK | BLACK |

TABLE 6

|  | Unit | Ex. 7 | Ex. 8 | Ex. 9 | Ex. 10 | Ex. 11 | Ex. 12 |
| --- | --- | --- | --- | --- | --- | --- | --- |
| Thermal conductivity (horizontal) | W/mK | 8.6 | 5.8 | 6.0 | 8.8 | 8.5 | 8.9 |
| Thermal conductivity (vertical) | W/mK | 0.96 | 0.87 | 0.86 | 0.97 | 0.98 | 0.97 |
| Electrical conductivity | Ω·cm | 1.4E+4 | 1.1E+13 | 1.1E+13 | 1.0E+14 | 0.9E+14 | 1.1E+4 |
| Tensile strength | kgf/cm$^2$ | 1042 | 830 | 750 | 1050 | 1020 | 1010 |
| Impact strength | J/m | 52 | 53 | 58 | 53 | 55 | 49 |
| Specific gravity | — | 1.70 | 1.71 | 1.94 | 1.84 | 1.85 | 1.71 |
| Heat dissipation time (circular specimen) | s | 9 | 14 | 14 | 9 | 9 | 9 |
| Heat dissipation time (plate specimen) | s | 81 | 118 | 116 | 83 | 80 | 81 |
| Type |  | Conducting | Insulating | Insulating | Insulating | Insulating | Conducting |
| Color |  | BLACK | BLACK | BLACK | BLACK | BLACK | BLACK |

TABLE 7

|  | Unit | Comp. Ex. 1 | Comp. Ex. 2 | Comp. Ex. 3 | Comp. Ex. 4 | Comp. Ex. 5 | Aluminum |
|---|---|---|---|---|---|---|---|
| Thermal conductivity (horizontal) | W/mK | 2.5 | 1.8 | 2.7 | 5.7 | 6.5 | — |
| Thermal conductivity (vertical) | W/mK | 0.65 | 0.58 | 0.63 | 0.71 | 0.75 | — |
| Electrical conductivity | $\Omega \cdot cm$ | 1.0E+5 | 1.0E+12 | 1.0E+12 | 1.0E+13 | 1.0E+4 | — |
| Tensile strength | kgf/cm$^2$ | 620 | 420 | 420 | 550 | 1055 | — |
| Impact strength | J/m | 32 | 28 | 29 | 31 | 50 | — |
| Specific gravity | — | 1.79 | 1.96 | 1.49 | 1.71 | 1.70 | 2.7 |
| Heat dissipation time (circular specimen) | s | 19 | 21 | 18 | 13 | 9 | — |
| Heat dissipation time (plate specimen) | s | 213 | 242 | 215 | 107 | 160 | 61 |
| Type |  | Conducting | Insulating | Insulating | Conducting | Insulating | — |
| Color |  | BLACK | WHITE | BLACK | BLACK | BLACK | — |

As shown in Tables 5 to 7, the resin compositions of Examples 1 to 12 had excellent thermal conductivities, especially excellent thermal conductivities of 5 W/mK or more in the horizontal direction, which is suitable for application as a heat dissipation plastic. In addition, the resin compositions of Examples 1 to 12 were excellent in such mechanical properties as tensile strength and impact strength. Furthermore, it was confirmed that the sample specimens made of the resin compositions of Examples 1 to 12 had specific gravities lower than that of metallic aluminum and heat dissipation times similar to that of metallic aluminum. In addition, the resin compositions of Examples 1 to 12 had high thermal conductivities in the vertical direction, thereby enhancing the heat conduction efficiency of the entire part and shortening the heat dissipation time. That is, the resin compositions of Examples 1 to 12 are suitable for applications in which a high thermal conductivity and a low specific gravity are required, especially for a wireless communication repeater.

In contrast, the resin compositions of Comparative Examples 1 to 3, which do not fall within the scope of the present invention, had very low thermal conductivities in the horizontal and vertical directions of less than 5 W/mK and 0.8 W/mK, respectively, and the heat dissipation time was remarkably long. In addition, the resin composition of Comparative Example 4 in which boron nitride without surface treatment was used had lower mechanical properties than those of the resin composition of Example 2. Furthermore, the resin composition of Comparative Example 5 was significantly longer in heat dissipation time of the plate specimen as compared with Example 3 that used spherical graphite, which confirms that the heat conduction efficiency would be decreased in a large molded article.

Example 13

The resin composition of Example 3 was molded using an injection molding machine at a cylinder temperature of 315 to 350° C. and a mold temperature of 150° C. Thereafter, the front surface of the molded article was plated by a general electroless plating method. The electroless plating was performed after surface etching.

The surface etching was conducted through a degreasing-etching-conditioning-catalyzing-accelerating process. Specifically, the degreasing was carried out by treating the molded article with an aqueous sulfuric acid solution of 0.1% by volume at 55° C. for 4 minutes. The etching was performed by pre-etching and main-etching processes after the acid treatment so that a Pd catalyst could be distributed on the surface of the molded article. The pre-etching was performed by immersing the molded article in an aqueous sulfuric acid solution of 0.18% by volume and treating it with an ultrasonic wave at 40 kHz for 1 minute. The main-etching was carried out by immersing the molded article in a mixed solution prepared by mixing chromic anhydride solution of 500 g-liter, an aqueous sulfuric acid solution of 0.2% by volume, and an aqueous permanganic acid solution of 0.08% by volume in equal amounts and etching at 68° C. for 3 minutes. The conditioning was performed by immersing the molded article in an aqueous sulfuric acid solution of 0.05% by volume at 25° C. for 3 minutes. The catalyzing process was performed by immersing the molded article in a mixed solution prepared by mixing an aqueous hydrochloric acid solution of 0.23% by volume and an aqueous Pd—Sn colloid solution of 0.15% by volume in equal amounts at room temperature for 2 minutes. The accelerating process was performed by treating the molded article with an aqueous hydrochloric acid solution of 0.12% by volume at 50° C. for 2 minutes.

Then, the electroless plating was continuously performed through the chemical reaction of copper as a metal and phosphorus in sodium hypophosphite and the redox reaction of the Pd catalyst.

Example 14

A molded article was produced in the same manner as in Example 13, except that vacuum deposition plating was used instead of the wet electroless plating.

The vacuum deposition plating was conducted by an aluminum sputtering process, and the sputtering process was performed by a pretreatment process, a sputtering process, and a top coating process. In the pretreatment process, the surface of the molded article was subjected to plasma treatment using nitrous oxide and argon gas. After the pretreatment, the argon gas was ionized, and an aluminum plate was collided with the ionized argon gas to deposit aluminum on the surface of the molded article. In order to impart corrosion resistance to the surface of the aluminum-deposited molded article, a hexamethyldisiloxane (HMDSO) gas was injected into the chamber to collide the HMDSO gas with ions and electrons in the plasma to form a top coating layer on the surface of the molded article.

Example 15

A molded article was produced in the same manner as in Example 13, except that the resin composition of Example 12 was used.

Test Example 2

The molded articles prepared in Examples 13 to 15 were tested for measuring their adhesive strengths according to the method as described below, and the measurement results are shown in Table 8 below.

Specifically, the initial adhesiveness of the molded articles of Examples 13 to 15 and the adhesiveness after aging were measured according to the ASTM D 3359 method. Here, the aging was carried out by treatment at 260° C. for 5 hours.

TABLE 8

|  | Ex. 13 | Ex. 14 | Ex. 15 |
| --- | --- | --- | --- |
| Adhesiveness (initial) | 5B | 5B | 5B |
| Adhesiveness (after aging) | 3B | 3B | 5B |

As shown in Table 8, the molded articles of Examples 13 to 15 exhibited excellent adhesion after plating. Especially, the molded article of Example 15, which further comprised a metal oxide in the resin composition, exhibited excellent adhesion even after the aging.

The invention claimed is:

1. A polyarylene sulfide-based resin composition, which comprises, based on a total weight of the polyarylene sulfide-based resin composition:
   10 to 80% by weight of a polyarylene sulfide,
   1 to 50% by weight of graphite, said graphite comprising spherical graphite,
   1 to 50% by weight of boron nitride, and
   1 to 50% by weight of at least one inorganic filler, said inorganic filler being selected from the group consisting of zinc sulfide, magnesium oxide, and zinc oxide.

2. The polyarylene sulfide-based resin composition of claim 1, wherein the polyarylene sulfide has a melt viscosity of 10 to 50,000 poises when measured at 300° C. in a rotating disk viscometer.

3. The polyarylene sulfide-based resin composition of claim 1, wherein the polyarylene sulfide has a number average molecular weight of 5,000 to 50,000 g/mole.

4. The polyarylene sulfide-based resin composition of claim 1, wherein the graphite further comprises expandable graphite.

5. The polyarylene sulfide-based resin composition of claim 1, wherein the graphite has an average particle diameter of 1 to 1,000 μm.

6. The polyarylene sulfide-based resin composition of claim 1, wherein the graphite, the boron nitride, and the inorganic filler are structurally connected to each other in surface contact with each other in the polyarylene sulfide.

7. The polyarylene sulfide-based resin composition of claim 1, wherein the boron nitride is one whose surface has been subjected to an organic coating treatment.

8. The polyarylene sulfide-based resin composition of claim 1, wherein the boron nitride has a hexagonal crystal structure with an average particle diameter of 5 to 1,000 μm and an aspect ratio of 50 to 300.

9. The polyarylene sulfide-based resin composition of claim 1, wherein the boron nitride comprises two or more boron nitride populations, each population having an average particle diameter from other populations.

10. The polyarylene sulfide-based resin composition of claim 1, which further comprises at least one additive selected from the group consisting of a metal oxide, a thermoplastic resin, a thermoplastic elastomer, an additional filler, which is different from the inorganic filler, an antioxidant, and a compatibilizer.

11. The polyarylene sulfide-based resin composition of claim 10, wherein the compatibilizer comprises at least one selected from the group consisting of silane compounds, maleic anhydride, titanate, zirconate, fumaric acid, phosphate, stearic acid, metal stearates, and waxes.

12. The polyarylene sulfide-based resin composition of claim 10, wherein the additional filler comprises a glass fiber having an average particle diameter of 5 to 15 μm and a length of 2 to 6 mm.

13. The polyarylene sulfide-based resin composition of claim 10, wherein the additive is contained in an amount of 0.1 to 50% by weight based on the total weight of the resin composition.

14. A molded article produced by molding the polyarylene sulfide-based resin composition according to claim 1.

15. The molded article of claim 14, which is in the form of a film, a sheet, or a fiber.

16. The molded article of claim 14, which is used for automobile parts, electric parts, electronic parts, or industrial materials.

17. The molded article of claim 16, which is a part for a mobile communication repeater.

* * * * *